United States Patent [19]

Kiest, Jr.

[11] Patent Number: 5,816,293

[45] Date of Patent: Oct. 6, 1998

[54] APPARATUS FOR INSTALLATION OF A LINER WITHIN A PIPELINE

[76] Inventor: Larry W. Kiest, Jr., 1757 Green St., Ottawa, Ill. 61350

[21] Appl. No.: 876,527

[22] Filed: Jun. 17, 1997

Related U.S. Application Data

[63] Continuation-in-part of Ser. No. 622,817, Mar. 27, 1996, Pat. No. 5,765,597.

[51] Int. Cl.$^6$ .............................. F16L 55/16; B29C 63/36
[52] U.S. Cl. .............................. 138/98; 138/97; 264/269; 264/516; 156/287; 425/503
[58] Field of Search ........................ 138/97, 98; 156/287, 156/294; 264/269, 516, 267, 36; 405/150.1, 154; 425/503

[56] References Cited

U.S. PATENT DOCUMENTS

| | | | |
|---|---|---|---|
| 2,794,758 | 6/1957 | Harper et al. | 156/286 |
| 3,230,129 | 1/1966 | Kelly | 156/287 |
| 3,494,813 | 2/1970 | Lawrence et al. | 156/287 |
| 3,560,295 | 2/1971 | Kimbrell et al. | 156/287 |
| 3,914,825 | 10/1975 | Reynolds | 24/115 R |
| 3,976,578 | 8/1976 | Beane | 210/484 |
| 4,064,211 | 12/1977 | Wood | 156/287 X |
| 4,167,358 | 9/1979 | Besha | 405/87 |
| 4,207,130 | 6/1980 | Barber | 156/244.13 |

(List continued on next page.)

FOREIGN PATENT DOCUMENTS

| | | |
|---|---|---|
| 1194264 | 1/1985 | Canada . |
| 241719 | 10/1987 | European Pat. Off. . |
| 518521 | 12/1992 | European Pat. Off. . |
| 518521A2 | 12/1992 | European Pat. Off. . |
| 5534969 | 3/1980 | Japan . |
| 5549225 | 4/1980 | Japan . |
| 618503 | 6/1976 | U.S.S.R. . |
| 618503 | 8/1978 | U.S.S.R. . |
| 1553408 | 9/1979 | United Kingdom . |
| 2018384 | 10/1979 | United Kingdom . |
| 2042673 | 9/1980 | United Kingdom . |
| 1580438 | 12/1980 | United Kingdom . |
| 1340068 | 12/1993 | United Kingdom . |
| 2273755 | 6/1994 | United Kingdom . |
| 8908218 | 9/1989 | WIPO . |
| WO16320 | 8/1993 | WIPO . |

OTHER PUBLICATIONS

Insituform (1985) Illustrates installation of a sewer pipe liner by the inversion method using a seamed, resin–impregnated liner.

NuPipe (Civil Engineering Magazine 1993) explains the installation method of a softened PVC pipe liner.

Paltem Portable Water Hose Lining Method describes a pipe liner installation method using a guide belt (no date available).

Paltem Sewer Hose Lining Method describes a compressed air inversion method of pipe lining (no date available).

*Primary Examiner*—Patrick F. Brinson
*Attorney, Agent, or Firm*—Zarley, McKee, Thomte, Voorhees & Sease

[57] ABSTRACT

The apparatus for installing a repair liner/sleeve within a pipeline includes a rigid tube supported above a manhole or excavation leading to the entry of the pipeline to be repaired. A rigid tube is supported on a plurality of legs aligned above the manhole, with a vertical tube attached to the rigid tube and extending downwardly into the hole. A hollow tubular shoe is attached to the lower end of the vertical tube, and is curved to redirect a liner/bladder assembly from the vertical orientation within the vertical tube to a horizontal orientation aligned with the pipeline to be repaired. The tubular shoe includes a plurality of upper rollers and lower rollers between which the liner/bladder assembly will be directed for reorientation from the vertical tube to the horizontal pipeline. The rigid tube includes a pivotal lid which will seal the upper end of the rigid tube, to permit pressurization of the rigid tube, flexible tube, and shoe. An air inlet port in the lid permits the introduction of pressurizing fluid, and a second port in the lid receives a control line for attachment to the liner/bladder assembly, for removal of the bladder after repair of the pipeline.

20 Claims, 8 Drawing Sheets

U.S. PATENT DOCUMENTS

| | | | |
|---|---|---|---|
| 4,284,507 | 8/1981 | Beane | 210/435 |
| 4,288,321 | 9/1981 | Beane | 210/170 |
| 4,322,232 | 3/1982 | Beane | 55/360 |
| 4,334,943 | 6/1982 | Zenbayashi et al. | 264/269 X |
| 4,350,548 | 9/1982 | Zenbayashi et al. | 156/156 |
| 4,366,012 | 12/1982 | Wood | 156/93 |
| 4,368,091 | 1/1983 | Ontsuga et al. | 264/269 X |
| 4,385,885 | 5/1983 | Wood | 156/287 X |
| 4,386,628 | 6/1983 | Stanley | 138/98 X |
| 4,427,480 | 1/1984 | Kamuro et al. | 156/287 |
| 4,576,205 | 3/1986 | Morinaga et al. | 138/98 |
| 4,581,247 | 4/1986 | Wood | 156/294 X |
| 4,600,615 | 7/1986 | Hyodo et al. | 138/97 |
| 4,685,983 | 8/1987 | Long, Jr. | 156/64 |
| 4,752,511 | 6/1988 | Driver | 138/97 X |
| 4,773,450 | 9/1988 | Stanley | 156/287 X |
| 4,778,553 | 10/1988 | Wood | 156/287 |
| 4,836,715 | 6/1989 | Wood | 138/98 X |
| 4,867,921 | 9/1989 | Steketee, Jr. | 138/98 X |
| 4,871,413 | 10/1989 | Hyodo et al. | 156/382 |
| 4,954,016 | 9/1990 | Storgard | 138/97 X |
| 4,985,196 | 1/1991 | LeDoux et al. | 264/516 |
| 5,044,405 | 9/1991 | Driver et al. | 138/98 |
| 5,108,533 | 4/1992 | Long et al. | 156/423 |
| 5,167,901 | 12/1992 | Driver et al. | 264/269 X |
| 5,223,204 | 6/1993 | Endoh | 156/287 X |
| 5,265,648 | 11/1993 | Lyon | 138/98 |
| 5,280,811 | 1/1994 | Catallo et al. | 138/98 |
| 5,322,653 | 6/1994 | Muller | 138/98 |
| 5,329,063 | 7/1994 | Endoh | 138/98 |
| 5,340,524 | 8/1994 | McMillan et al. | 264/269 X |
| 5,358,359 | 10/1994 | Long | 405/154 |
| 5,388,616 | 2/1995 | Muller et al. | 138/98 |
| 5,393,481 | 2/1995 | Wood | 264/269 |
| 5,486,332 | 1/1996 | Kamiyama et al. | 156/287 X |
| 5,490,964 | 2/1996 | Kamiyama et al. | 138/98 X |
| 5,501,248 | 3/1996 | Kiest | 156/287 |
| 5,520,484 | 5/1996 | Kamiyama et al. | 156/287 X |
| 5,549,856 | 8/1996 | Yokoshima | 138/98 X |
| 5,597,353 | 1/1997 | Alexander, Jr. | 156/287 X |
| 5,692,543 | 12/1997 | Wood | 138/98 |
| 5,700,110 | 12/1997 | Kamiyama et al. | 156/287 X |

FIG. 9

APPARATUS FOR INSTALLATION OF A LINER WITHIN A PIPELINE

CROSS-REFERENCE TO RELATED APPLICATION

This is a continuation-in-part application of application Ser. No. 08/622,817 filed Mar. 27, 1996, entitled APPARATUS FOR REPAIRING A PIPELINE AND METHOD FOR USING THE SAME now U.S. Pat. No. 5,765,597.

TECHNICAL FIELD

The present invention relates generally to an apparatus for installing a liner within a pipeline, and more particularly to improved support and dispensing structures mounted at the entrance of an excavation or manhole for dispensing a liner into a pipeline.

BACKGROUND OF THE INVENTION

One method of repairing damaged sewer pipe is to excavate the area surrounding the sewer pipe and replace the broken portion. This is a very expensive and a labor intensive solution and is also an inconvenience to residents living in the area and utilizing roadways overlying the area.

Another solution is in situ relining of sewer pipes. In situ methods typically utilize a resin coated liner which is inserted into the existing sewer pipeline and unrolled against the sewer pipe. The unrolled liner is held against the existing sewer pipe while the resin cures to form a new pipe lining within the existing pipe.

One example of such a method is shown in U.S. Pat. No. 4,366,012. In this patent a process utilizing an elongated outer tube having an inner tube comprised of felt is shown. Uncured resin is introduced into the tube and is used to impregnate the felt inner tube. The two concentric tubes are then inverted into the end of the sewer pipe to be repaired and the inversion process continues until the area of the sewer pipe needing repair has been reached by the inverting tubes. Upon inversion the impregnated felt liner is placed on the outside of the original outer liner, and is pressed against the interior surface of the sewer pipe. When the resin cures a new pipe liner is provided at the area to be repaired by this process.

The applicant's co-pending '817 patent application shows a method for impregnating a curable resin in a layer of resin absorbent material located within an elongated flexible bladder tube having a fill end and a vacuum end positioned down stream from the fill end. The bladder tube includes two walls forming a tube cavity therein. The layer of resin absorbent material has a down stream end positioned a predetermined distance from the vacuum end of the bladder tube, and an upstream end. An elongated gas conduit having first and second conduit ends is placed within the tube cavity with the first conduit end positioned up stream from the down stream of the resin absorbent material and with the second conduit end positioned down stream from the down stream end of the resin absorbent material.

A quantity of curable resin is then introduced into the fill end of the bladder tube, the quantity of resin being sufficient to impregnate all of the resin absorbent material within the bladder tube. A vacuum source is then connected to the bladder tube at a point spaced down stream from the down stream end of the resin absorbent material whereby the wall of the bladder tube will collapse on the layer of resin absorbent material and the gas conduit will provide a path for evaluating gas through the collapsed two walls. Gas is continuously evacuated from the bladder tube until the curable resin moves to the down stream end of the absorbent material and completely impregnates the absorbent material.

Conventional methods for inserting this liner within the sewer pipe involve the use of a tower or scaffold which is 25–30 feet high in order to provide the necessary water pressure head required to invert the liner and push it along the length of the pipe to be lined. While such a structure has been successfully utilized in the field, it is relatively expensive and requires a great deal of equipment and manpower to erect and upright.

Another disadvantage is the use of water for the process of inverting the liner within the sewer pipe. Initially, it is difficult to work with the structure necessary to create the water pressure required for lengthy or large diameter liner installations. In addition, the high pressure of the water during the inversion process can squeeze the resin out of the liner, decreasing the strength and durability of the repair. Prior art lighters are conventionally manufactured with a coating or layer of flexible material such as urethane, which will remain affixed to the liner after the inversion process, with the liner in contact with the pipeline. However, it can be seen that this dual layer assembly requires much greater pressure to roll and invert, thereby requiring an even higher scaffold and water head to provide that pressure. For small diameter pipes, it would be virtually impossible to invert such a combination.

A more recent attempt to overcome these problems is found in U.S. Pat. No. 4,685,983 to Charles A. Long, Jr. The Long patent discloses a large tank on a trailer which may be pressurized to provide air pressure for the inversion process. The Long apparatus utilizes an overhead dispensing conduit which dispenses the concentric tubular liner apparatus from inside the tank, upwardly out of an opening in the top of the tank, and thence downwardly through a rigid tube to the sewer pipe, wherein the liner is then dispensed to line the sewer pipe. While the '983 patent avoids the use of water pressure for inverting the tube and liner, the apparatus is still large and cumbersome in use, and the number of bends and elbows in the dispensing apparatus increases the pressure required to dispense the tube and invert the liner.

SUMMARY OF THE INVENTION

It is therefore a general object of the present invention to provide an improved apparatus for dispensing and installing a liner within a pipeline.

Another object is to provide an apparatus for installing a liner within a pipeline which reduces the necessary pressure for inverting the liner and carrier tube within the pipeline, as compared to prior art apparatus.

Still another object of the present invention is to provide an improved liner installation apparatus which is simple to use, economical to manufacture, and easily transported between job sites.

These and other objects of the present invention will be apparent to those skilled in the art.

The apparatus for installing a repair liner/sleeve within a pipeline includes a rigid tube supported above a manhole or excavation leading to the entry of the pipeline to be repaired. A rigid tube is supported on a plurality of legs aligned above the manhole, with a vertical tube attached to the rigid tube and extending downwardly into the hole. A hollow tubular shoe is attached to the lower end of the vertical tube, and is curved to redirect a liner/bladder assembly from the vertical orientation within the vertical tube to a horizontal orientation aligned with the pipeline to be repaired. The tubular shoe includes a plurality of upper rollers and lower rollers between which the liner/bladder assembly will be directed for reorientation from the vertical tube to the horizontal pipeline. The rigid tube includes a pivotal lid which will seal the upper end of the rigid tube, to permit pressurization of the rigid tube, flexible tube, and shoe. An air inlet port in the lid permits the introduction of pressurizing fluid, and a second port in the lid receives a control line for attachment to the liner/bladder assembly, for removal of the bladder after repair of the pipeline.

A second embodiment of the installation apparatus includes a hollow enclosed launching tank having an operable door in the rearward end and a rigid tube mounted on the forward end at the upper portion thereof for dispensing a liner/bladder assembly. A removable tray is inserted within the tank and supports a liner/bladder assembly which has been fan folded into a stack, to retain the entire liner/bladder assembly within the tank. A forward wall of the tray is sloped and has a plurality of rollers mounted thereon to assist in the dispensing of the liner/bladder assembly into the rigid tube. Preferably, the rigid tube includes an upper and lower roller mounted at the rearward end thereof adjacent the connection to the tank, to assist in directing the liner/bladder assembly from the tank into the rigid tube. A flexible tube is connected to the rigid tube to direct the liner/bladder assembly outwardly from the tank and down into a manhole or excavation to the entrance of the pipeline to be repaired. A hollow tubular shoe is mounted at the lower end of the flexible tube to direct the liner/bladder assembly from the vertical tube into the pipeline. The tank includes an air inlet for pressurization of the tank and inversion of the liner/bladder assembly, and a port in the door to receive a control line for attachment to the liner/bladder assembly for removal of the bladder after the repair.

DESCRIPTION OF THE PREFERRED EMBODIMENTS

Figure 1:
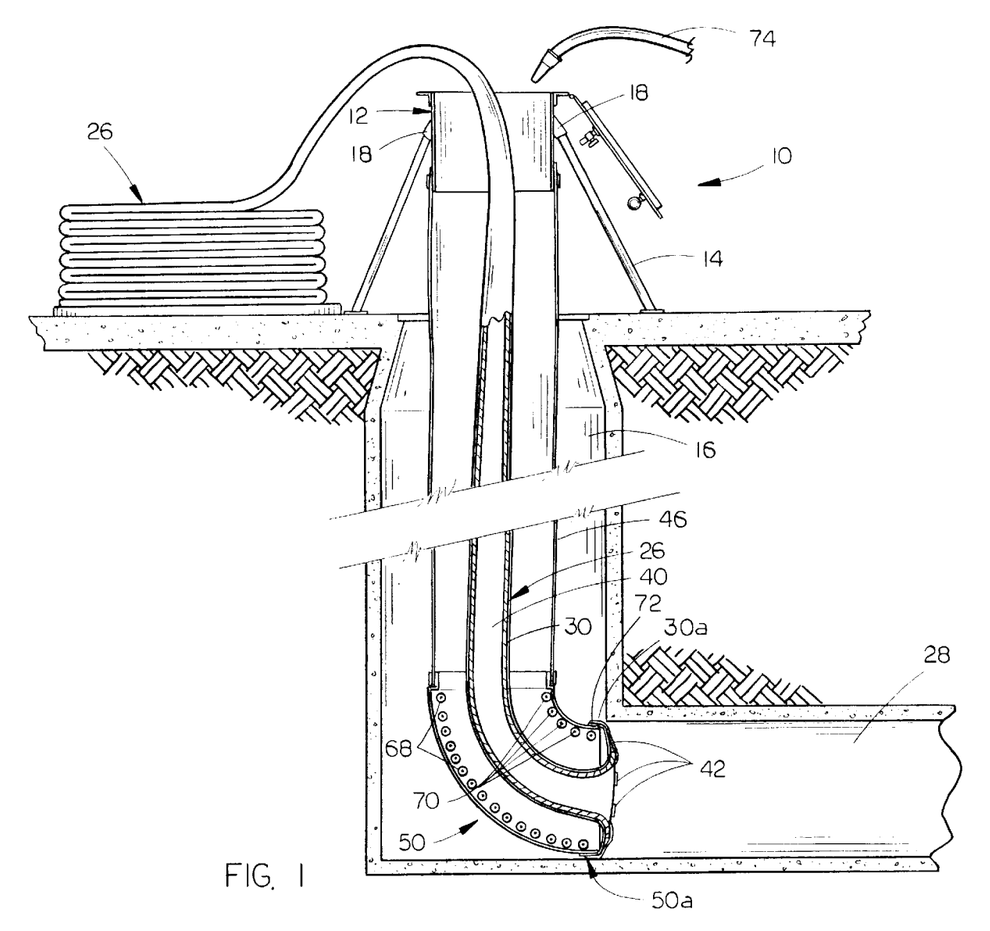
FIG. 1 is a vertical sectional view through the support structure of the present invention showing an initial step in the installation of a liner in a pipeline.

Referring now to the drawings, in which similar or corresponding parts are identified with the same reference numeral and more particularly to FIG. 1, a first embodiment of the installation apparatus of the present invention is designated generally at 10 and includes a rigid tube 12 supported on a plurality of spaced apart legs 14 and positioned over a hole 16 into which the liner will be directed. Although hole 16 is shown as a manhole in the drawings, it should be understood that the installation apparatus of the present invention may be used in conjunction with excavations or other types of holes as well.

Figure 2:
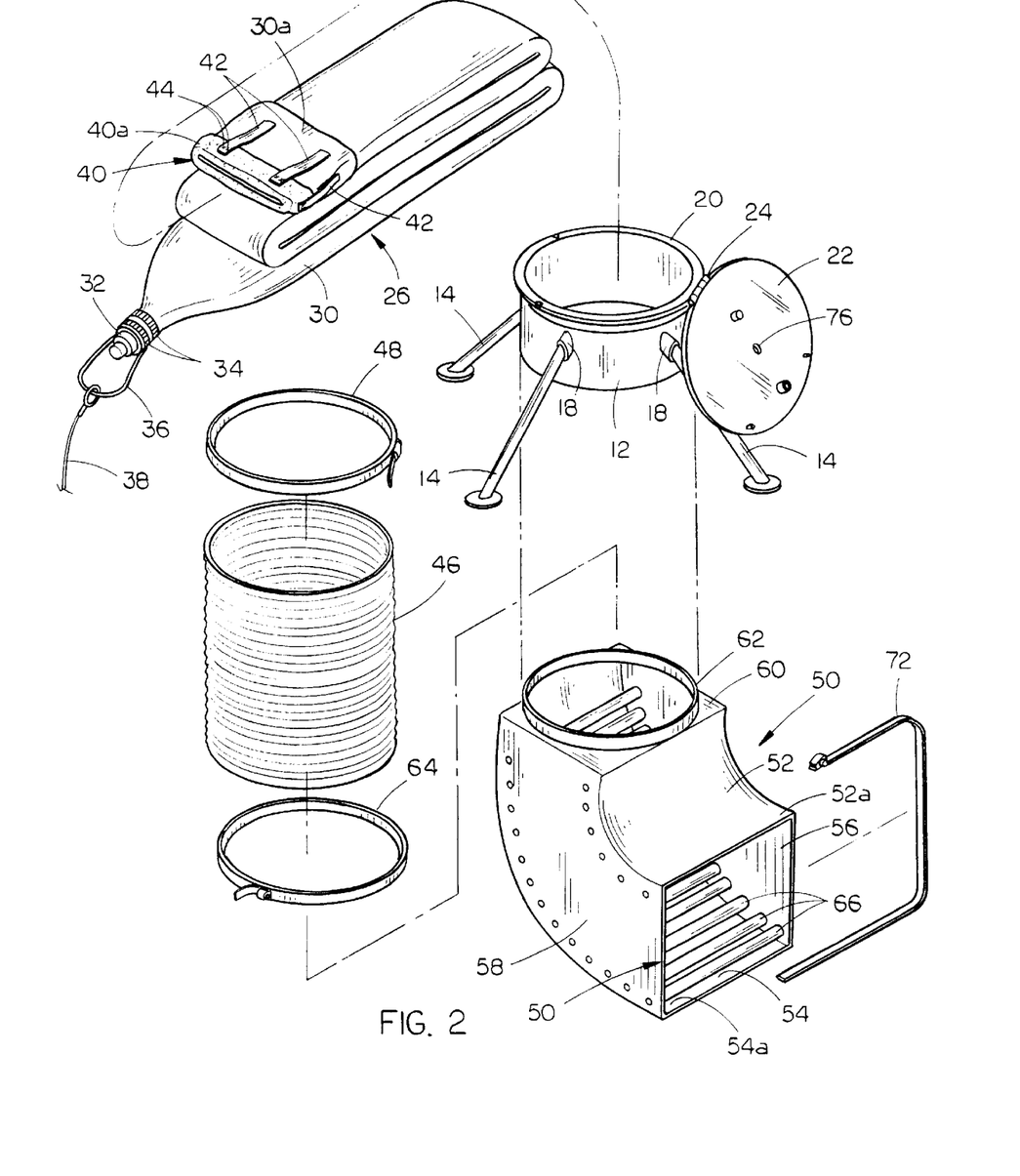
FIG. 2 is an exploded perspective view of the various components of the installation apparatus for the process shown in FIGS. 1–6.

Referring now to FIG. 2, it can be seen that rigid tube 12 includes a plurality of radially projecting collars 18 which will removably receive the upper ends of legs 14 therein to support rigid tube 12 above the desired hole. An annular flange 20 projects radially outwardly from the upper edge of rigid tube 12, and has a lid 22 pivotally attached to the flange by a hinge 24. As discussed in more detail hereinbelow, lid 22 may be closed and sealed against flange 20 to form an airtight seal.

A liner/bladder assembly 26 is shown in a stacked orientation ready for insertion into the pipeline 28 to be repaired. The process for preparing the line/bladder assembly is set forth in detail in the applicant's co-pending '817 application, and the contents of that application are hereby incorporated by reference thereto.

Liner/bladder assembly 26 includes a bladder tube 30 with a threaded receptacle 32 in the rearward end thereof, held in place by clamps 34. A pulling loop 36 is also held by clamps 34, and is attached to a bladder control line 38.

Within bladder tube 30 is repair sleeve 40, formed of felt or other resin absorbent material. Sleeve 40 has a plurality of attachment strips 42 secured to its forward end 40a by stitches. The forward ends of attachment strips 42 are affixed to the interior surface of the forward end 30a of bladder tube 30 by heat sealing, adhesive, or other permanent attachment means. The stitches 44 are easily broken away so as to permit the forward end of the repair sleeve 40 to be separated from the rearward end of the attachment strips 42 and the forward end of bladder tube 30 by a dynamic tension force. It should be noted that the forward end of bladder tube 30 is shown inverted, or rolled back upon itself, in FIG. 2, to show the interior surface thereof, and the forward end of repair sleeve/liner 40.

A flexible hose 46 is attached to the bottom end of rigid tube 12 with a clamp 48, to form an airtight connection to rigid tube 12. Flexible hose 46 has a length determined by the distance from rigid tube 12 to the pipeline (shown in FIG. 1) at the bottom of the hole 16.

A shoe 50 is secured to the lower end of flexible hose 46, and redirects the liner/bladder assembly 26 from a vertical orientation to a horizontal orientation aligned with the pipeline at the bottom of the hole. Shoe 50 is a hollow tubular member with an arcuate inward wall 52 curved through a 90° arc, an arcuate outward wall 54, also curved through a 90° arc and concentric with inward wall 52, and a pair of opposing side walls 56 and 58 connecting inward and outward walls 52 and 54. An upper wall 60 has a vertically projecting flange 62 mounted thereon which will receive the lower end of flexible tube 46. A clamp 64 attaches flexible hose 46 in sealed engagement with flange 62 to form an airtight seal.

A plurality of rollers 66 are rotatably mounted between shoe walls 56 and 58. A set 68 of lower rollers are mounted parallel to the outward wall 54 and are located along the entire length of outward wall 54, from adjacent upper wall 60 to the lower end 54a. An upper set of rollers 70 (shown in FIG. 1) are mounted between side walls 56 and 58 parallel to one another and parallel and adjacent inward wall 52, from the upper wall 60 to the lower end 52a of inward wall 52. As shown in FIG. 1, the upper and lower roller sets 70 and 68 serve to redirect the liner/bladder assembly 26 as it is dispensed from the vertical flexible tube 46 to the horizontally oriented pipe 28. The use of these rollers greatly reduces the friction involved in turning through this angle, and thereby reduces the pressure necessary to install the liner/bladder assembly 26.

The initial step in installing the repair sleeve 40 within pipeline 28, includes providing a liner/bladder assembly 26, with the repair sleeve 40 fully impregnated with resin, as described in detail in the co-pending '817 application. The forward end 30a of bladder tube 30 is journaled through rigid tube 12, flexible tube 46, and shoe 50, so as to project out the lower end 50a of shoe 50. The forward end 30a of bladder tube 30 is then inverted, or rolled inside out and affixed to the lower end 50a of shoe 50 by a clamp 72 (shown in FIG. 2), to form an airtight seal on shoe 50.

This entire assembly is then lowered into hole 16 and rotated until the lower end 50a of shoe 50 is aligned with pipeline 28. Legs 14 are inserted within sockets 18 to support the assembly within hole 16.

Water is introduced into the open end of rigid tube 12 via a hose 74 or the like. As the level of water within shoe 50 and flexible tube 46 rises, the increase in pressure will cause bladder 30 to invert forwardly into pipeline 28. It can be seen that attachment strips 42 will then cause the forward end of repair sleeve/liner 40 to invert, so as to place the resin impregnated repair sleeve 40 into contact with the pipeline 28, as shown in FIG. 3.

Once the rearward end 30b of bladder tube 30 has passed through the open end of rigid tube 12, control line 38 is threaded through a port 76 (see FIG. 2) in lid 22 and attached to pulling loop 36. Lid 22 is then closed and locked in position on rigid tube 12.

Figures 3, 4:
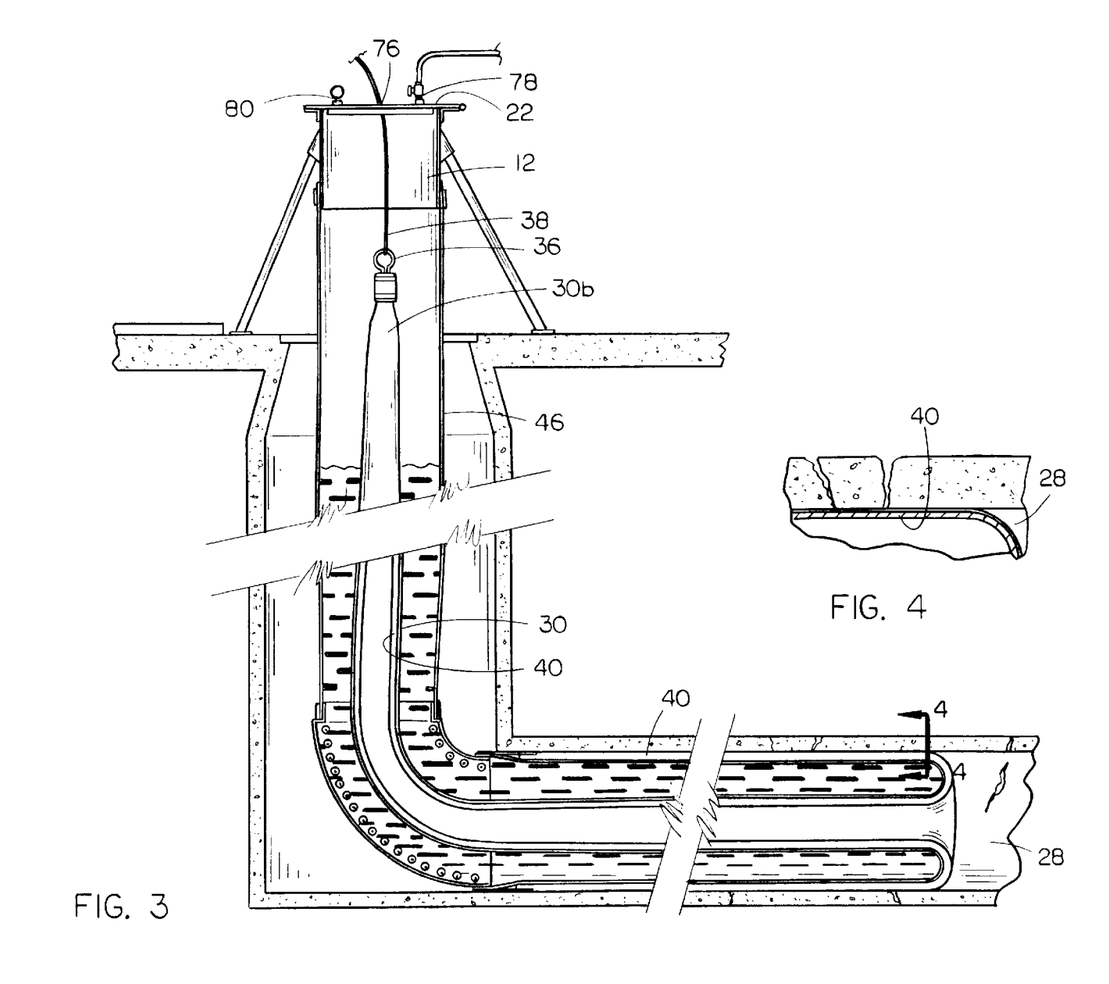
FIG. 3 is a sectional view similar to FIG. 1, showing a second step in the installation procedure.
FIG. 4 is an enlarged sectional view taken at lines 3—3 in FIG. 2.
Figure 5:
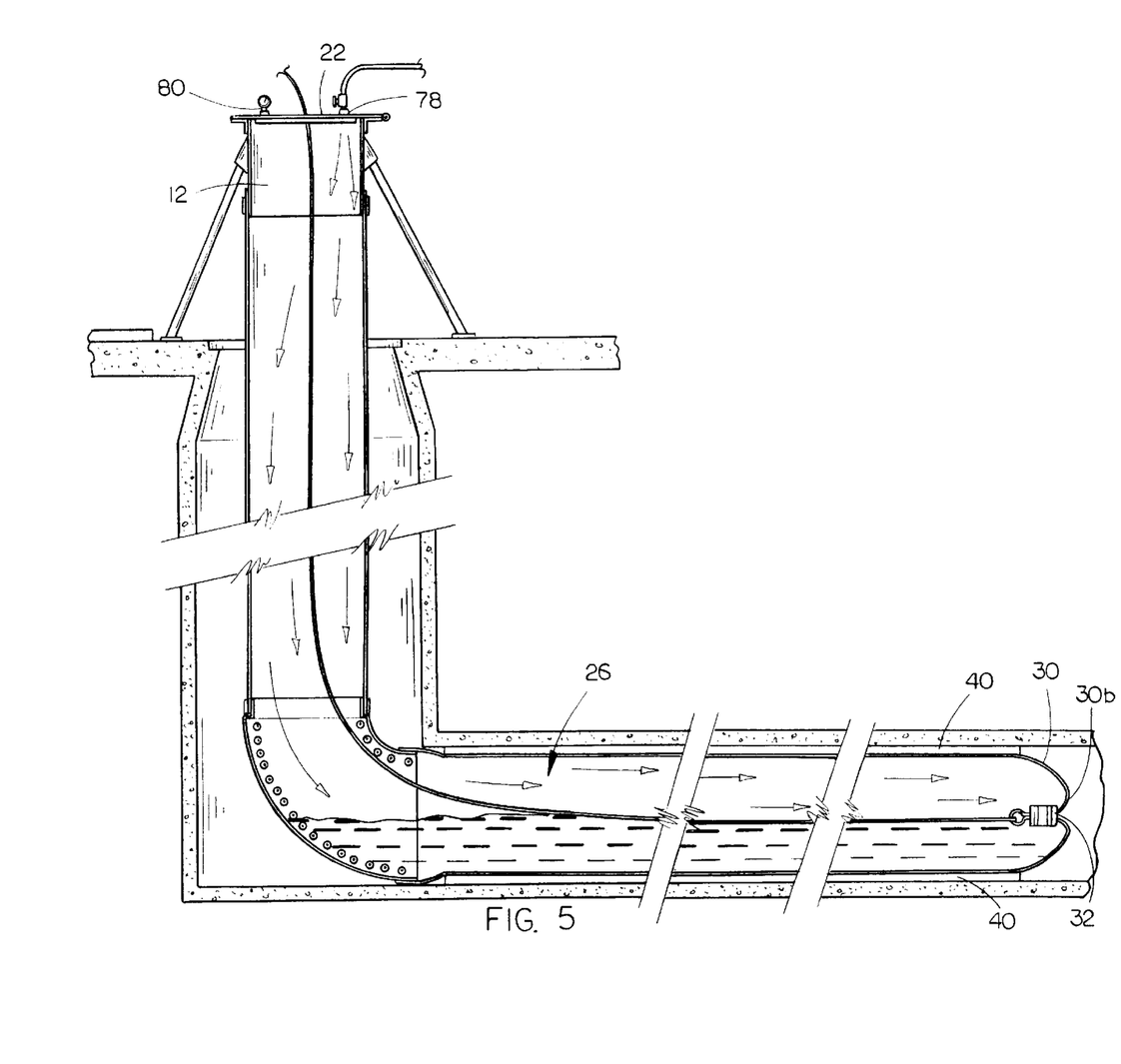
FIG. 5 is a vertical sectional view similar to FIGS. 1 and 2, showing a third step in the installation process.
Figure 6:
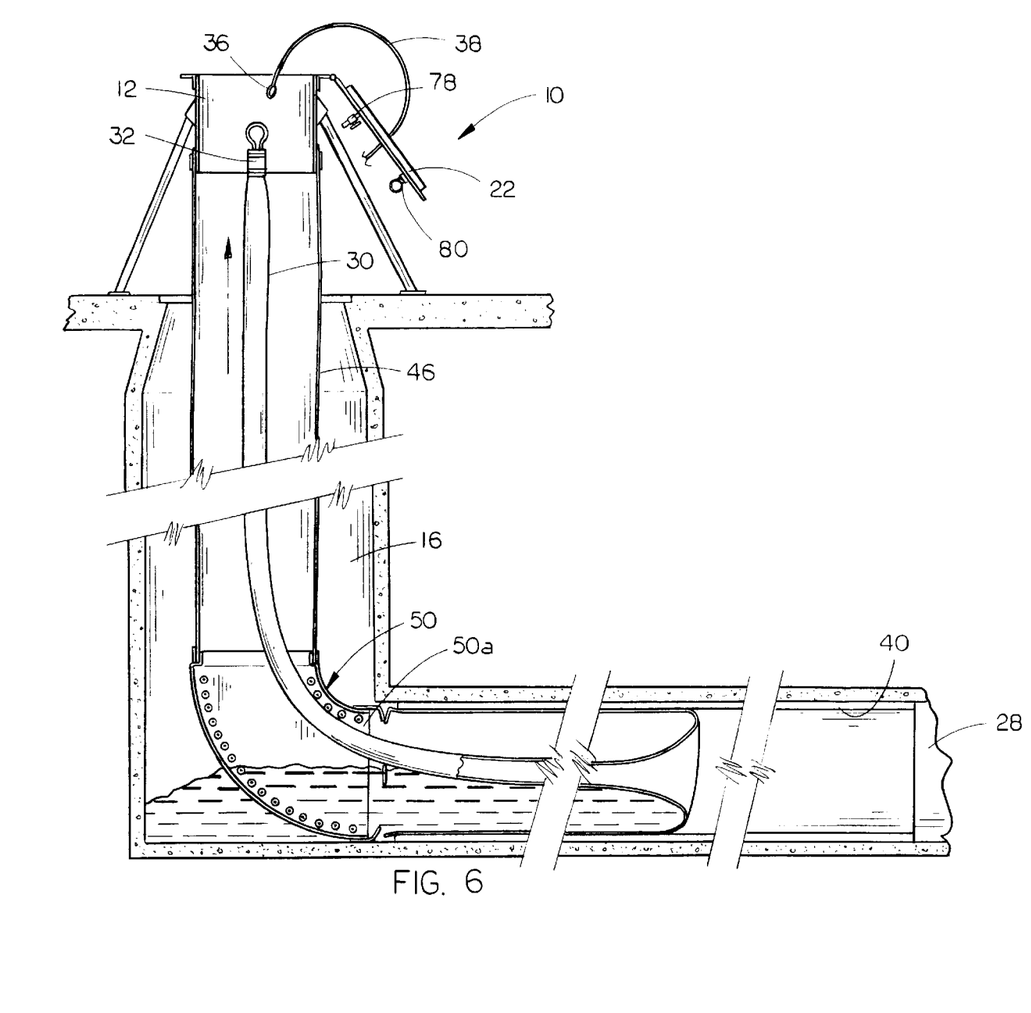
FIG. 6 is a view similar to FIG. 4, showing a fourth step in the installation process.

As shown in FIGS. 3 and 5, lid 22 includes an air inlet 78, and a pressure gauge 80 mounted in a separate port in the lid. Regulated air pressure is then introduced through air inlet port 78 into rigid tube 12, and flexible tube 46, to provide air pressure to continue the inversion of bladder tube 30, as shown in FIG. 5. Once the end version is complete, the water within the liner/bladder assembly 26 will reside in the bottom of the bladder tube 30 while the air will fill the upper half of the bladder tube 30. The repair sleeve/liner 40 has a rearward end position spaced from the rearward end 30b and receptacle 32 of bladder 30, so that the sleeve 40 is open once the bladder is completely inverted as shown in FIG. 5.

Once bladder 30 is completed inverted, air pressure is maintained therein until the resin impregnating repair sleeve 40 has completely cured. As shown in FIG. 4, resin impregnated sleeve 40 will cover cracks and other damage to the pipeline 28. Once the resin has cured, the bladder tube 30 is cut open at the lower end 50a of shoe 50, allowing the water to escape into hole 16 and thence out pipeline 28. The operator then reverts bladder 30 by pulling on control line 38 until receptacle 32 reaches rigid tube 12. Lid 22 is then opened and control line 38 disconnected from pulling loop 36. Bladder 30 is then continuously "reverted" peeling the bladder from repair sleeve 40 affixed within pipeline 28. Once bladder 30 is removed, then shoe 50, flexible tube 46, and rigid tube 12 of installation apparatus 10 may be removed from hole 16.

Figure 7:
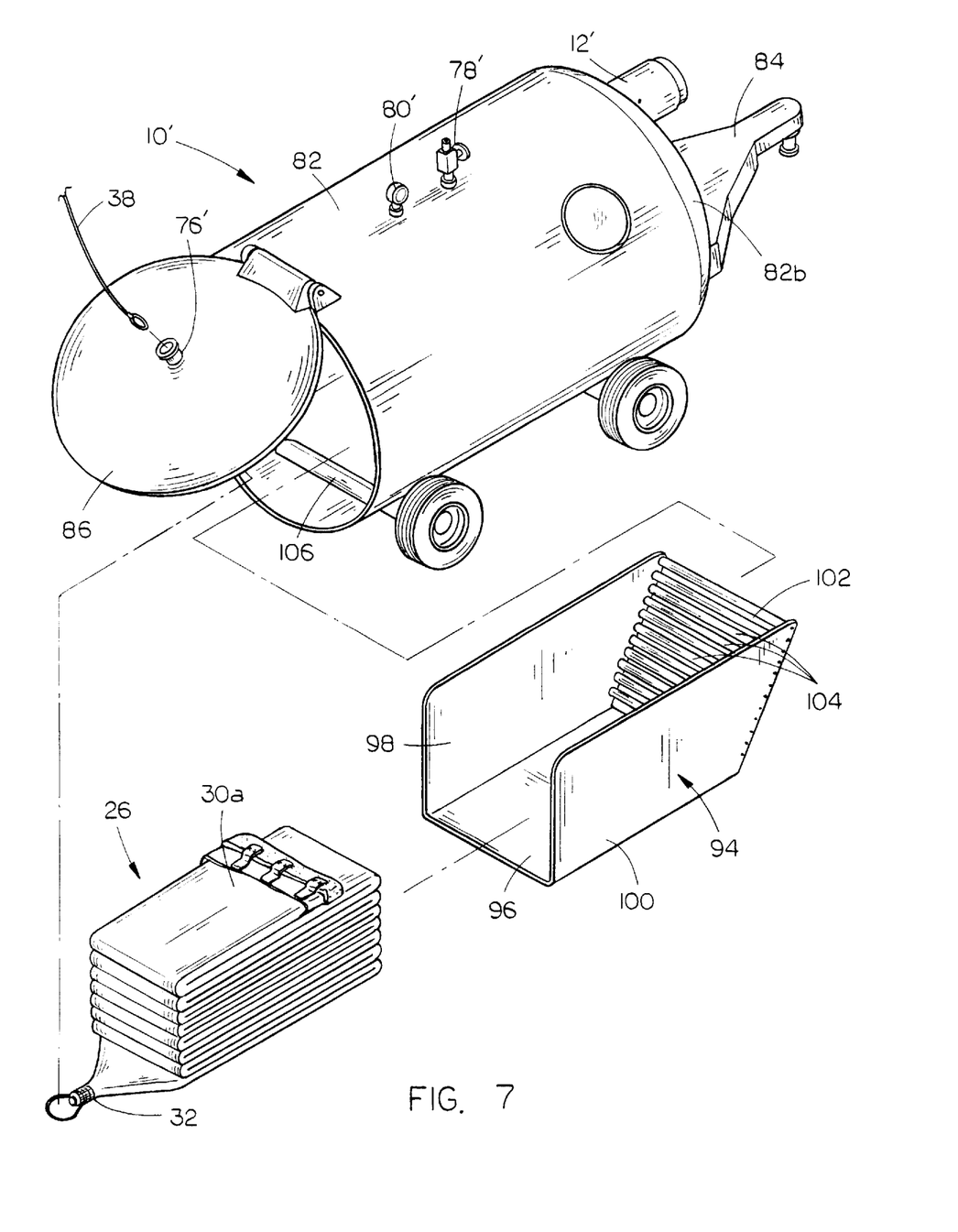
FIG. 7 is an exploded perspective view of a second embodiment of the installation apparatus of the present invention.
Figure 8:
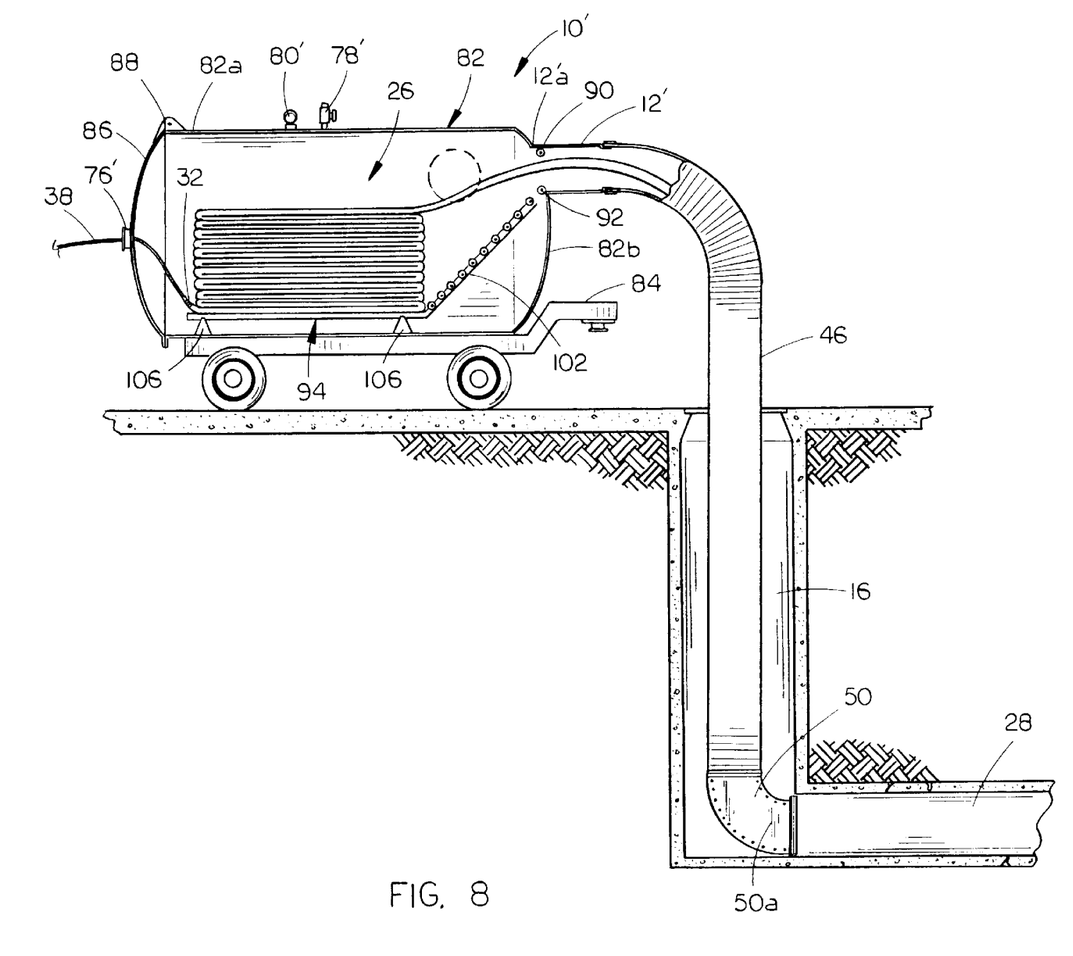
FIG. 8 is a sectional view through the second embodiment of the installation apparatus showing the apparatus in place and showing the first step in the process of installing a liner in a sewer pipe.
Figure 9:
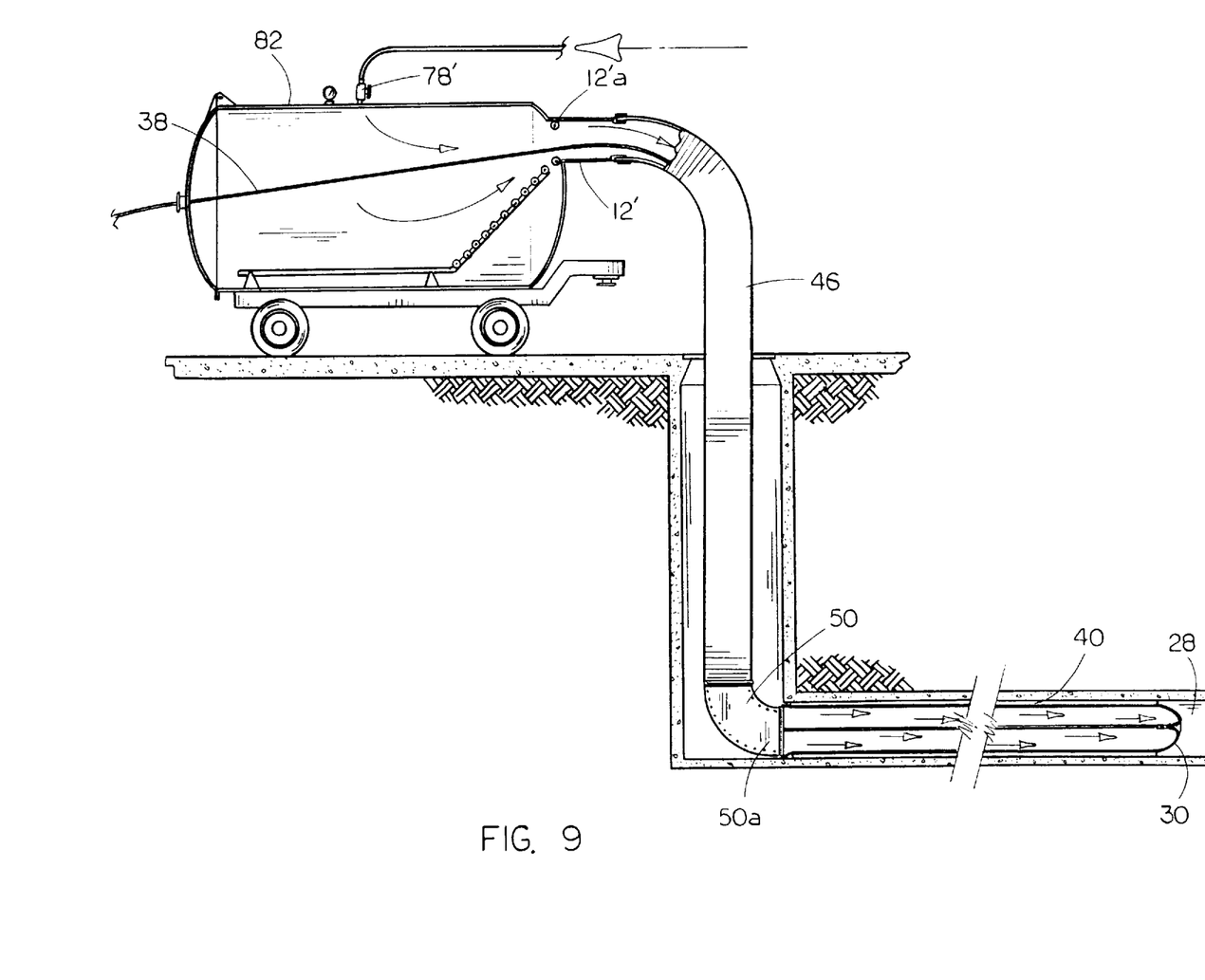
FIG. 9 is a view similar to FIG. 9, showing a second step in the installation process.

Referring now to FIGS. 7–9, a second embodiment of the installation apparatus is designated generally at 10', and is utilized to dispense a conventional liner/bladder assembly 26, as described in detail hereinabove. As with the first embodiment, installation apparatus 10' is positioned on the ground adjacent an excavation or manhole 16 at the opening of the pipeline 28 to be repaired. Installation apparatus 10' utilizes the same flexible tube 46 and shoe 50 as installation apparatus 10.

In place of the tripod consisting of rigid tube 12 and legs 14 of installation apparatus 10 (shown in FIG. 1) a launching tank 82 is provided, within which the entire liner/bladder assembly 26 is retained for installation. Tank 82 is preferably an enclosed cylindrical steel vessel supported on a wheeled cart 84 to permit easy transport. The rearward end 82a of tank 82 includes a pivotable door 86 mounted on a hinge 88, and may be closed and sealed to permit pressurization of tank 82. As with the first embodiment of the installation apparatus, installation apparatus 10' includes an air inlet 78' and an air pressure gauge 80' communicating with the interior of tank 82. A port 76' in door 86 will receive the control line 38 therethrough.

The forward end 82b of tank 82 has a rigid tube 12' projecting outwardly therefrom and communicating with the interior of tank 82. Flexible tube 46 is connected to rigid tube 12', and is flexible enough to curve from the horizontal orientation of rigid tube 12' to the vertical orientation of hole 16. As shown in FIGS. 8 and 9, the rearward end 12'a of rigid tube 12' includes a pair of horizontally oriented upper and lower rollers 90 and 92 located at the top and bottom of rigid tube 12', to guide liner/bladder assembly 26 into rigid tube 12' and flexible tube 46 with minimal friction and resistance.

A tray 94 is removably positioned within tank 82 to support liner/bladder assembly 26 during installation. As shown in FIG. 7, tray 94 includes a flat bottom 96, opposing parallel longitudinal sides 98 and 100, and a sloped forward end 102. The top and rearward end of tray 94 are open, to permit installation and removal of liner/bladder assembly 26. A plurality of parallel horizontally disposed rollers 104 are rotatably mounted between sides 98 and 100 along the forward end 102, to form a ramp of rollers over which liner/bladder assembly 26 will be conveyed. Tray 94 is slidably supported on a pair of projecting ridges 106 within tank 82.

In use, liner/bladder assembly 26 is first fan folded into a stack, with the forward inverted end 30a of bladder tube 30 on top, and the receptacle 32 at the bottom rearward end of tray 94. Tray 94 is then slid into tank 82 through the open rearward end such that the sloped forward end 102 of tray 94 is positioned with the uppermost roller immediately adjacent the rigid tube lower roller 92 (as shown in FIG. 8). The open forward end of the liner/bladder assembly is then pulled through rigid tube 12', flexible hose 46, and shoe 50 and then banded to the lower end 50a of shoe 50, as described with respect to the first embodiment to the invention. Shoe 50 and flexible hose 46 are then disposed downwardly into hole 16 with the lower end 50a of shoe 50 aligned with pipe 28. Control line 38 is then threaded through port 76' in door 86 and attached to receptacle 32 on the rearward end of liner/bladder assembly 26. Door 86 is then closed to seal tank 82.

Air pressure is introduced into tank 82 through air inlet 78' to cause bladder tube 30 to invert, as shown in FIG. 9, and apply repair sleeve 40 to pipeline 28. Once bladder tube 30 has been completely inverted, and the resin in repair sleeve 40 has cured, the control line 38 may be pulled to revert bladder tube 30 back through flexible tube 46 and into tank 82.

Whereas the installation apparatus of the present invention has been shown and described in connection with the preferred embodiments thereof, many modifications, substitutions and additions may be made which are within the intended broad scope of the appended claims.

I claim:

1. Apparatus for installing a liner sleeve within a pipeline, the pipeline oriented generally horizontally and having an entrance at the bottom of a hole in the ground, comprising:
   a rigid tube supported above the hole, above the ground, having upper and lower ends;
   a vertical tube having an upper end attached to the lower end of the rigid tube, and a lower end disposed within the hole above the pipeline entrance; and
   a hollow tubular shoe attached to the lower end of the vertical tube, having an open upper end communicating with the vertical tube and an open lower end directed generally horizontally in alignment with the pipeline entrance;
   said shoe having an arcuate inward face extending from the upper end to the lower end, and an arcuate outward face extending from the upper end to the lower end and spaced outwardly from the inward face;
   a first plurality of rollers rotatably mounted on parallel axes adjacent the inward face and within the shoe, and arranged from the shoe upper end to the shoe lower end; and
   a second plurality of rollers rotatably mounted on parallel axes adjacent the outward face and within the shoe, and arranged from the shoe upper end to the shoe lower end.

2. The apparatus of claim 1, wherein said shoe inward and outward faces are generally parallel to one another.

3. The apparatus of claim 1, wherein said shoe further includes opposing side walls extending from the upper to the lower ends and connecting the inward and outward faces, and wherein said first and second plurality of rollers are mounted on axes extending between the side walls and parallel to the inward and outward faces.

4. The apparatus of claim 1, wherein said shoe includes an annular flange projecting upwardly from the upper end thereof, and further comprising means for removably mounting the lower end of the vertical tube to the flange.

5. The apparatus of claim 1, wherein said vertical tube is flexible, to permit curvature along its length.

6. The apparatus of claim 1, further comprising means for removably attaching the upper end of the vertical tube to the lower end of the rigid tube.

7. The apparatus of claim 1, further comprising a plurality of legs having upper ends uniformly spaced around and connected to the rigid tube and lower ends in engagement with the ground, to support the rigid tube above the ground.

8. The apparatus of claim 7, wherein said legs are removably mounted in sockets which are mounted on the rigid tube.

9. The apparatus of claim 1, further comprising a lid operably attached to the upper end of the rigid tube for selectively closing the tube upper end and forming an airtight seal, said lid including a port for receiving a control line therethrough, and an air inlet port for inputting compressed air into the rigid tube.

10. The apparatus of claim 9, wherein said lid is hinged to the rigid tube for pivotal movement between open and closed positions.

11. The apparatus of claim 9, further comprising a port formed in said lid with an air pressure regulator operably mounted therein.

12. A method for repairing a generally horizontal pipeline having an entrance at the bottom of a hole in the ground, comprising the steps of:

forming a liner/bladder assembly having an elongated flexible bladder tube with an open forward end, a closed rearward end, and an interior surface, a repair sleeve impregnated with uncured material capable of curing and hardening, said repair sleeve extending along the interior surface of the bladder tube from a forward end proximal and spaced rearwardly of the bladder tube forward end, to a rearward end spaced forwardly of the bladder tube rearward end, and attachment means affixed to the bladder tube forward end interior surface and frangibly connected to the sleeve forward end;
   moving a forward end of the liner/bladder assembly through an installation assembly comprising a rigid tube with a vertical tube connected at a lower end thereof and a hollow tubular shoe connected at a lower end of the vertical tube, said shoe having an upper and lower pluralities of rollers rotatably mounted therein for rotation as the liner/bladder assembly is moved through the shoe;
   inverting the forward end of the bladder tube radially outwardly and attaching it to a lower end of the shoe to form an airtight seal;
   applying fluid pressure within the installation assembly to thereby continuously invert the bladder tube and the sleeve connected thereto, whereby the sleeve engages an interior surface of the pipeline;
   continuing to apply fluid pressure once the bladder tube has inverted to its rearward end, until the uncured material cures to a hardened condition; and
   pulling the rearward end of the bladder tube rearwardly through the pipeline and installation apparatus to remove the same.

13. The method of claim 12, wherein the steps of applying fluid pressure and continuing to apply fluid pressure include the steps of:
   dispensing liquid into the installation assembly between the liner/bladder assembly and the tubular walls of the rigid tube, vertical tube, and shoe, until the rearward end of the bladder is pulled into the rigid tube by the pressure of the liquid inverting the liner/bladder assembly;
   threading a control line through a port in a lid for the rigid tube and attaching the line to the rearward end of the bladder tube;
   attaching the lid to an upper end of the rigid tube to seal the same; and
   applying air pressure to the interior of the installation apparatus through an air inlet in the lid, to continue to invert the liner/bladder assembly.

14. The method of claim 12, wherein the step of pulling the rearward end of the bladder includes breaking the frangible connection of the attachment means with the repair sleeve, whereby the bladder is removed and the repair sleeve is left in place in the pipeline.

15. Apparatus for installing a liner sleeve within a pipeline, the pipeline oriented generally horizontally and having an entrance at the bottom of a hole in the ground, comprising:
   a hollow, enclosed launching tank having forward and rearward end, upper and lower walls, and an interior chamber;
   a generally horizontally oriented rigid tube mounted on the forward end of the tank proximal the upper wall thereof and communicating with an opening in the tank forward wall;

said tank rearward end including a door operable between an open position permitting access to the tank interior chamber, and a closed position sealing the tank;

an inlet port in said tank, for the input of fluid under pressure, to thereby selectively pressurize the tank;

a port in the door through which a bladder control line may be journaled; and a tray removably supported within the tank, for supporting a liner/bladder assembly;

said tray including:
- a generally planar bottom;
- opposing generally parallel side walls extending upwardly from side edges of the bottom;
- a sloped forward wall extending forwardly from a forward edge of the bottom and connecting forward edges of the side walls; and
- a plurality of rollers rotatably mounted between the side walls with axes spaced along parallel and proximal to the forward wall.

16. The apparatus of claim 15, further comprising a pair of upper and lower rollers rotatably mounted within a rearward end of the rigid tube proximal the connection to the tank, with the lower roller adjacent the bottom surface of the rigid tube and the upper roller adjacent a top surface of the rigid tube, to assist in directing a liner/bladder assembly from the tray to the rigid tube.

17. The apparatus of claim 16, wherein said rigid tube rollers have parallel axes, and have axes parallel to the tray rollers when the tray is installed within the tank.

18. The apparatus of claim 15, further comprising a wheeled support frame upon which said tank is mounted, for transportability.

19. The apparatus of claim 15, wherein said door is pivotally connected to said tank by a hinge.

20. The apparatus of claim 15, further comprising a flexible tube connected to said rigid tube, having a length to extend from the tank to the entrance of the pipeline at the bottom of the hole, and a hollow tubular shoe connected to a lower end of the flexible tube, for redirecting a liner/bladder assembly journaled within the flexible tube from a generally vertical orientation to a generally horizontal orientation aligned with the pipeline entrance.

* * * * *